(No Model.) 2 Sheets—Sheet 1.

O. P. LOOMIS.
COUPLING DYNAMOS.

No. 396,580. Patented Jan. 22, 1889.

Witnesses
Geo. W. Breck
Carrie E. Ashley

Inventor
Osborn P. Loomis
By his Attorneys
Fowler & Fowler (No Model.)
2 Sheets—Sheet 2.

O. P. LOOMIS.
COUPLING DYNAMOS.

No. 396,580. Patented Jan. 22, 1889.

Witnesses
Geo. W. Breck.
Carrie E. Ashley.

Inventor
Osborn P. Loomis
By his Attorneys
Fowler & Fowler

UNITED STATES PATENT OFFICE.

OSBORN P. LOOMIS, OF SOMERVILLE, MASSACHUSETTS, ASSIGNOR TO THE LOOMIS ELECTRIC MANUFACTURING COMPANY, OF NEW YORK.

COUPLING DYNAMOS.

SPECIFICATION forming part of Letters Patent No. 396,580, dated January 22, 1889.

Application filed September 13, 1887. Serial No. 249,578. (No model.)

*To all whom it may concern:*

Be it known that I, OSBORN P. LOOMIS, a citizen of the United States, residing at Somerville, in the county of Middlesex and State of Massachusetts, have invented certain new and useful Improvements in Coupling Dynamos, of which the following is such a full, clear, and exact description as will enable any one skilled in the art to which it appertains to make and use the same, reference being had to the accompanying drawings, forming part of this specification.

My invention relates more particularly to the coupling of compound-wound dynamos when arranged in multiple arc to supply an electrical circuit.

When dynamos are coupled in circuit as indicated, they are apt to vary in electro-motive force, so that the stronger will overcome the weaker. Even when such machines are made exactly alike they will develop this difference of electro-motive force spoken of.

The object of my invention is to supply a means whereby each dynamo will have the same effect as the other or others, and thus keep the electro-motive force of the several dynamos the same. I am aware that such dynamos have heretofore been provided with an equalizing-connection to overcome the above trouble, which is well known to electricians.

My invention consists of electro-magnets arranged in the circuits emanating from the dynamos to the main circuit, which magnets control contact devices to so modify the magnetizing effect of the coils of the dynamos as to keep each one at its constant of work.

Figure 1:
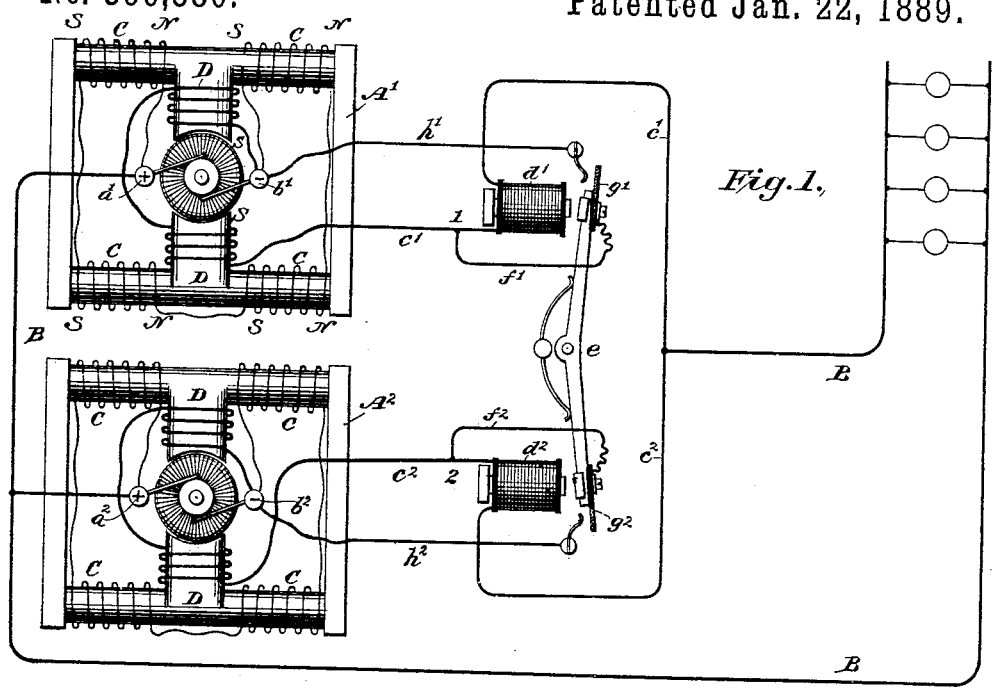
Figure 2:
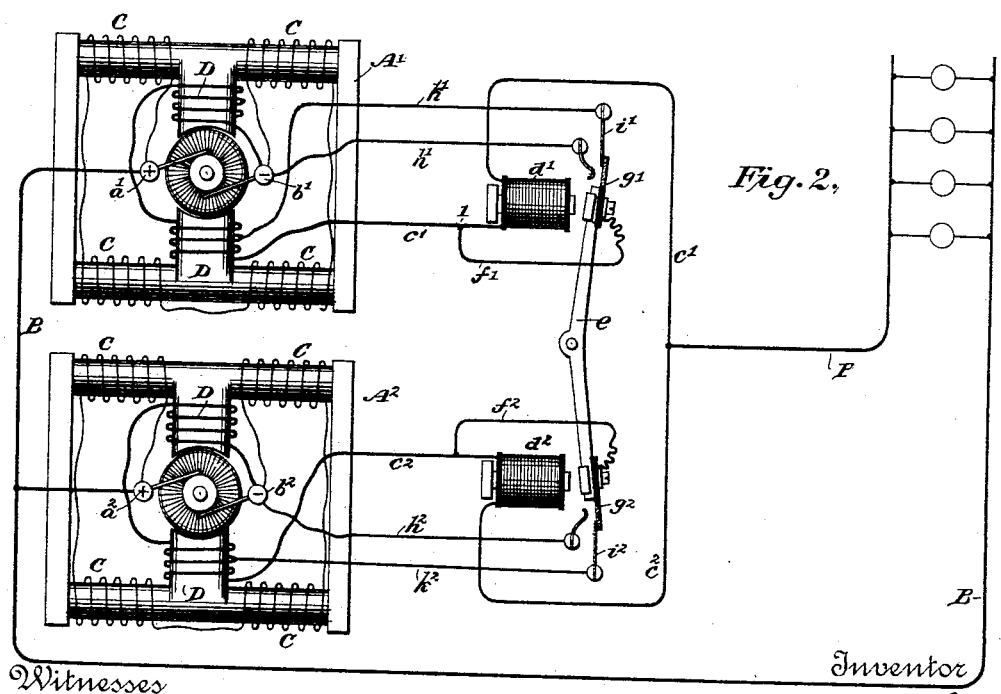

Figure 1 is a diagrammatic view of an apparatus, showing the principle of the invention; Fig. 2, a diagrammatic view of a modification thereof, and Fig. 3 a still further modification.

In the several figures of the drawings the same letters indicate the same or corresponding parts throughout.

$A'$ and $A^2$ designate two dynamos coupled in multiple arc, supplying a main circuit, B B.

C C are the derived or shunt circuit coils, and D D the main or series coils, which latter I have shown as wound upon the pole-pieces. This feature of winding the series coil upon the pole-pieces forms no part of my invention as described and illustrated in the present case, the same being shown and claimed by me in another application, Serial No. 249,246, filed September 9, 1887.

$a'$ $b'$ represent the positive and negative terminals, respectively, of the dynamo $A'$, and $a^2$ $b^2$ the corresponding terminals of the dynamo $A^2$, the current being conveyed to the same by brushes bearing upon the commutator, as ordinarily. The series coils are shown as connected to the binding-post $b'$ and $b^2$, and the circuits thereof pass from said coils through circuits $c'$ $c^2$, the index of the letters in each instance indicating the dynamo referred to. The circuits $c'$ $c^2$ are connected with return-circuit B. In these circuits are placed electro-magnets $d'$ and $d^2$, and between the electro-magnets is a pivoted lever, $e$, which is held in its normal position by one or more springs and bears armatures for said electro-magnets. This lever is connected by circuits $f'$ and $f^2$ to the circuits $c'$ and $c^2$, respectively, at the points 1 2. The lever $e$ bears at each end, preferably, carbon contacts insulated from the same, which are adapted to be placed in circuit with conductors $h'$ and $h^2$, respectively, leading to the negative terminal of each dynamo, the terminals of said conductors being arranged in co-operative proximity to the contacts borne by the said lever.

Let us suppose now that the dynamo $A'$ generates an electro-motive force in excess of the electro-motive force furnished by the dynamo $A^2$ from any cause. Ordinarily this would cause the current of dynamo $A'$ to short-circuit itself by way of the circuits $c'$ and $c^2$ upon the dynamo $A^2$, and thus overpower the latter. By the construction I have described this would not occur, for the magnet $d'$ would in the case supposed be more strongly energized by reason of the excess of electro-motive force from the dynamo $A'$ than the electro-magnet $d^2$, and would thus draw the pivoted lever $e$ in contact with the conductor $h'$. A short circuit would then be formed around the series coils D D by way of conductor $h'$, contact $g'$, and circuit $f'$. The series coils having thus been cut out of circuit, the dynamo A′ would have less magnetizing effect, and the action of the two dynamos be thereby equalized. The spring brings the lever $e$ back to its original position and restores the apparatus to its normal condition. Should the dynamo A² overpower the dynamo A′, the reverse operation would take place and the main coils D D of said dynamo be short-circuited by way of the conductor $h^2$, contact $g^2$, and circuit $f^2$, and the dynamo A′ be restored to its normal capacity.

In Fig. 2 I have shown an arrangement embodying a modification of the above to illustrate how the principle can be applied in a slightly-modified way. Here I provide springs $i'$ $i^2$, against which the contacts $g'$ and $g^2$, respectively, bear normally, and conductors $k'$ and $k^2$, leading from said springs to a point intermediate of the ends of the series coils, so that a portion of the series coils is normally shunted by the circuits $k'$ and $k^2$, contacts, and conductors $f'$ and $f^2$. I do not limit myself to the arrangement shown, but illustrate the same merely to set forth the principle of operation. Should now the dynamo A² overpower the dynamo A′, the contacts $g'$ and $i'$ will be separated, and the contact $g^2$ be placed in electrical communication with the conductor $h^2$. This will put in circuit all the series coils of the dynamo A′, increase its magnetizing effect and thereby its current, and will short-circuit the series coils of the dynamo A², as before explained, decrease its magnetizing effect and lessen its current, so as to bring the same up to the normal capacity. Should the dynamo A′ overbalance the dynamo A², the reverse operation will take place, and a like result be accomplished. The contact-springs $i'$ and $i^2$ may serve to bring the armature-lever $e$ back to its normal position after the equalizing effect has been accomplished.

Figure 3:
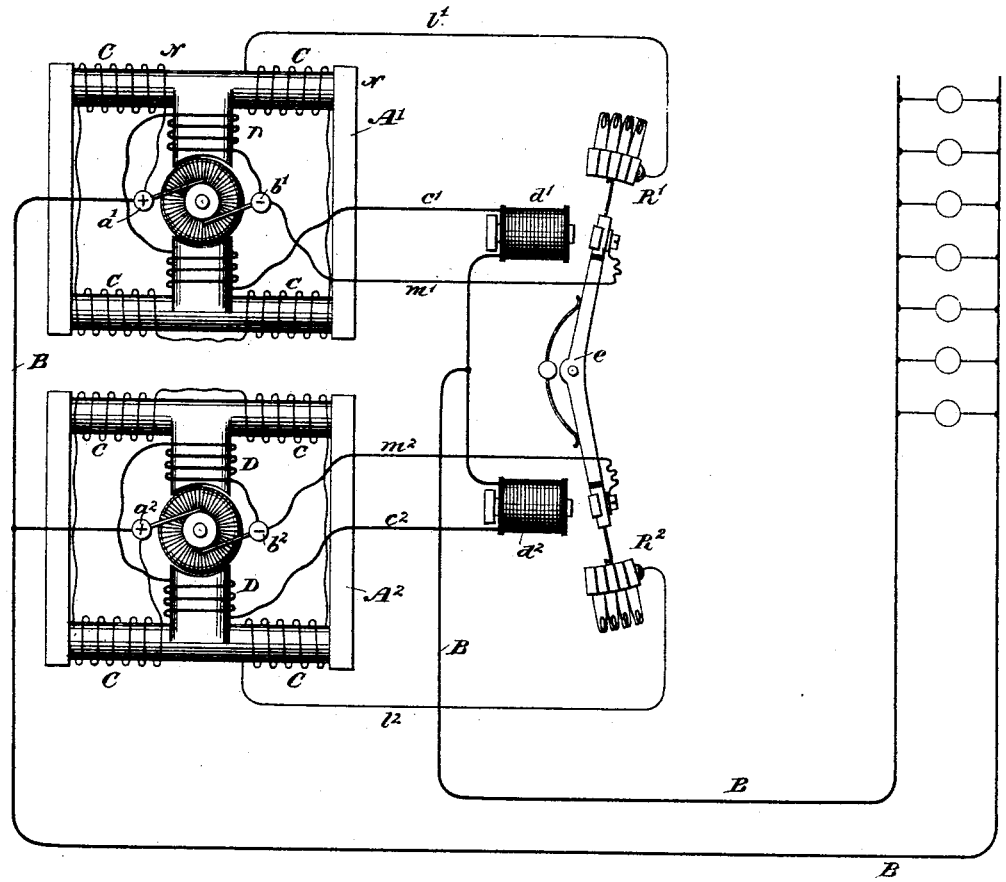

In Fig. 3 I have illustrated a still further modification, in which I dispense with short-circuiting and putting in more turns of the series coils, and produce the required effect by modifying, preferably, the resistance of the shunt-coils. The electro-magnets $d'$ and $d^2$ are arranged in the circuits $c'$ and $c^2$, and the lever $e$ disposed as in the previous instances. From the shunt-coils I run wires $l'$ $l^2$ to graduated resistances R′ and R², and from the negative poles are run the conductors $m'$ $m^2$, connecting, respectively, with the insulated circuit-closers upon the respective ends of the lever $e$. When one dynamo in this arrangement overpowers the other, the circuit-completers are caused to rub along the graduated resistances, so as to throw in more resistance in the shunt-coils of the most powerful dynamo and to interpose less resistance in the shunt-coils of the less powerful dynamo, thus decreasing the magnetizing effect of one dynamo and increasing the magnetizing effect of the other, so as to equalize the action of said dynamos.

Of course the poles of the apparatus described may be interchanged—that is, positive placed where a negative is shown, and vice versa—without affecting the operation of the apparatus and departing from the invention. So, too, the principle which I have shown embodied in coupling together two dynamos in multiple arc could be extended so as to be applied to more than two dynamos without departing from the invention. It will be evident, also, that the various devices I have described may be changed and modified in many respects by those skilled in the art and still be within my invention. I wish to have it understood, therefore, that I do not limit myself to the exact mechanism described; but What I desire to claim and secure by Letters Patent of the United States is—

1. The combination, with dynamo-machines supplying current to an electric current in multiple arc, of electro-magnets arranged in the circuits emanating from said dynamo-machines, and contacts controlled thereby to modify the magnetizing effect of the field-magnet coils thereof, so as to produce an equalizing effect between the same.

2. The combination, with dynamo-machines arranged in multiple arc in an electric circuit, of electro-magnets arranged in the circuits emanating from said dynamos, contacts controlled by said electro-magnets as one or the other dynamo overbalances the other, and electrical connections from the field-magnet coils having their terminals arranged in the path of said contacts, for the purpose described.

3. The combination of the dynamos A′ and A² of any suitable type arranged in multiple arc in an electric circuit, the electro-magnets $d'$ $d^2$ in the circuits leading from said dynamos, a pivoted lever, $e$, disposed between the same, and electrical connections from said dynamos controlled by said electro-magnets and lever to equalize the current supplied by said dynamos upon a rise of potential in either.

4. The combination, with the compound-wound dynamos A′ and A² of any suitable type arranged in multiple arc in an electric circuit, of the electro-magnets $d'$ and $d^2$ in the circuits emanating from said dynamos, a normally-open short circuit around the series coils of said dynamo, and contact devices controlled by the preponderance of current circulating in said electro-magnets to close the short circuit of the series coils of the preponderating dynamo to equalize the current supplied by the two.

5. The combination, with the compound-wound dynamos A′ and A² of any suitable type supplying an electric circuit in multiple arc, of a normally-open short circuit around the series coils of each, electro-magnets arranged in the circuits emanating from said dynamos and in the circuit of said short circuit when established, and a pivoted lever maintained in normal position bearing armatures for said electro-magnets, and controlled thereby to establish one or the other short circuit as one or the other dynamo preponderates in electro-motive force.

In testimony whereof I have hereunto set my hand and seal, this 9th day of September 1887, in the presence of the two subscribing witnesses.

OSBORN P. LOOMIS. [L. S.]

Witnesses:
 CHAS. A. PIERCE,
 GEORGE WYATT DICKERMAN.